United States Patent
Marupaduga (10) Patent No.: US 11,184,900 B1
(45) Date of Patent: Nov. 23, 2021

(54) SYSTEMS AND METHODS FOR MITIGATING INTERFERENCE AND IMPROVING PERFORMANCE

(71) Applicant: Sprint Spectrum LP, Overland Park, KS (US)

(72) Inventor: Sreekar Marupaduga, Overland Park, KS (US)

(73) Assignee: T-Mobile Innovations LLC, Overland Park, KS (US)

(*) Notice: Subject to any disclaimer, the term of this patent is extended or adjusted under 35 U.S.C. 154(b) by 0 days.

(21) Appl. No.: 16/837,077

(22) Filed: Apr. 1, 2020

(51) Int. Cl.
| | | |
|---|---|---|
| *H04W 72/08* | (2009.01) | |
| *H04W 88/06* | (2009.01) | |
| *H04W 24/10* | (2009.01) | |
| *H04W 16/14* | (2009.01) | |
| *H04W 36/14* | (2009.01) | |
| *H04W 72/12* | (2009.01) | |

(52) U.S. Cl.
CPC ......... *H04W 72/082* (2013.01); *H04W 16/14* (2013.01); *H04W 24/10* (2013.01); *H04W 36/14* (2013.01); *H04W 72/1215* (2013.01); *H04W 88/06* (2013.01)

(58) Field of Classification Search
CPC ... H04W 72/082; H04W 16/14; H04W 24/10; H04W 36/14; H04W 72/1215; H04W 88/06
See application file for complete search history.

(56) References Cited

U.S. PATENT DOCUMENTS

| | | | |
|---|---|---|---|
| 8,874,127 B2 | 10/2014 | Brisebois et al. | |
| 2014/0179336 A1* | 6/2014 | Steer | H04W 16/14 455/456.1 |
| 2015/0156782 A1* | 6/2015 | Manssour | H04J 11/0059 455/452.1 |
| 2016/0021588 A1* | 1/2016 | Dar | H04W 28/08 370/331 |
| 2016/0128004 A1* | 5/2016 | Lee | H04W 52/146 370/311 |
| 2016/0262170 A1* | 9/2016 | Lee | H04W 72/1215 |
| 2019/0320396 A1* | 10/2019 | Bagheri | H04W 72/1289 |
| 2020/0163101 A1* | 5/2020 | Caretti | H04W 72/1268 |
| 2020/0245401 A1* | 7/2020 | Ingale | H04W 12/0017 |

FOREIGN PATENT DOCUMENTS

WO 2019/075598 A1 4/2019

* cited by examiner

*Primary Examiner* — Ernest G Tacsik (57) ABSTRACT

A system for mitigating interference and improving performance of wireless devices within a sector is in a cellular network is described. The cellular network provides a first and second radio access technology (RAT). The system includes an access node having a processor performing multiple operations. The operations include determining that interference associated with the first RAT within the sector exceeds a threshold interference value and comparing a performance metric of the wireless devices to a predetermined value to determine if the performance metric is below the predetermined value. Upon determination that the performance metric is below the predetermined value and the interference exceeds a threshold value, the processor dynamically limits a number of wireless devices operating using the first RAT within the sector.

14 Claims, 7 Drawing Sheets

SYSTEMS AND METHODS FOR MITIGATING INTERFERENCE AND IMPROVING PERFORMANCE

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Deployment of the evolving RATs in a network provides numerous benefits. For example, newer RATs may provide additional resources to subscribers, greater network coverage, faster communications speeds, and other advantages.

Wireless devices trying to reach a base station from a cell edge of a sector within a wireless network transmit using a higher power than wireless devices in other portions of the sector. This is particularly true of wireless devices, such as high-powered wireless device, designed for using newer RAT technologies that often utilize a higher uplink transmission power when transmitting communications to the base station than other wireless devices. The increased uplink transmission power can create interference within the sector and impact performance of other wireless devices communicating within the sector. Thus, having a large number of wireless devices transmitting from a cell edge to a base station using, for example, a 5G RAT, can cause excessive noise within the sector. Furthermore, due to the high interference at base station, any additional wireless devices entering the sector have their throughput adversely impacted.

Furthermore, deployment of evolving RATS also creates numerous challenges for network operators. Because multiple RATs are in use over the network simultaneously, and the newer technologies are deployed over time, newer RAT technologies can over-load the network and result in slower service or service interruptions. Further, network resources devoted to pre-existing RAT technologies may be under-utilized, thereby resulting in a waste of network resources and capacity.

Therefore, there is a need for systems and methods that can improve overall resource utilization of different RATs within a wireless network. A solution is also needed that will improve performance and decrease interference within sectors of a wireless network.

Overview

Exemplary embodiments described herein include systems, methods, and processing nodes for mitigating interference and improving performance for wireless devices within a sector in a cellular network providing a first and second RAT. A method for mitigating interference and improving performance for the wireless includes measuring interference within the sector associated with the first RAT and detecting that the interference within the sector exceeds a threshold interference value. The method additionally includes measuring a performance metric of the wireless devices in the sector and comparing the performance metric to a predetermined value to determine if the performance metric is below the predetermined value. Upon determination that the performance metric is below the predetermined value and that the interference exceeds a threshold interference value, the method includes dynamically limiting a number of wireless devices operating using the first RAT within the sector.

An exemplary system is described herein for mitigating interference and improving performance for wireless devices within a sector in a cellular network providing a first and a second RAT. The system includes an access node having a processor performing multiple operations. The operations include determining that interference associated with the first RAT within the sector exceeds a threshold interference value and comparing a performance metric of the wireless devices to a predetermined value to determine if the performance metric is below the predetermined value. Upon determination that the performance metric is below the predetermined value and that the interference exceeds a threshold interference value, the processor dynamically limits a number of wireless devices operating using the first RAT within the sector.

An exemplary processing node is described herein for mitigating interference and improving performance for wireless devices within a sector in a cellular network providing a first and a second RAT. The processing node performs operations including determining that interference associated with the first RAT within the sector exceeds a threshold interference value and comparing a performance metric of the wireless devices to a predetermined value to determine if the performance metric is below the predetermined value. Upon determination that the performance metric is below the predetermined value and that the interference exceeds a threshold interference value, the processing node dynamically limits a number of wireless devices operating using the first RAT within a cell edge region of the sector.

DETAILED DESCRIPTION

Exemplary embodiments described herein include systems, methods, and processing nodes for mitigating interference and improving performance for wireless devices within a sector of a cellular network deploying multiple RATs. For example, networks disclosed herein may utilize two different RATs, such as, for example, new radio (NR) 5G and long term evolution (LTE) RATS. Embodiments may utilize an EN-DC architecture, which allows devices to access both LTE and 5G simultaneously on the same spectrum band. Through this technology, wireless devices receive the benefit of capacity from both an LTE network as well as a 5G network.

In embodiments disclosed herein, a cell or wireless network may be provided by an access node. The access node may communicate with wireless devices or UEs using two or more RATs. The wireless devices and access node may be configured to support multiple RATs. Wireless devices transmitting from a cell edge to the access node may transmit using a higher power than other wireless devices communicating with the access node, as a higher power is required in order to reach the access node from the cell edge. Thus, these devices at the cell edge may cause interference and a deterioration in performance of other devices within the network. The probability and magnitude of interference may be higher when the wireless devices utilize a newer RAT, such as a 5G RAT. Accordingly, it may be desirable to limit the number of wireless devices in a particular sector utilizing a RAT allowing higher uplink transmission power. It may further be desirable to limit the number of users in the cell edge utilizing the RAT allowing higher uplink transmission power.

In exemplary embodiments, the network may utilize an "Evolved Universal Terrestrial Radio Access (E-UTRA) New Radio (NR)-Dual Connectivity (DC)" or EN-DC configuration. In such a configuration, the network may utilize an LTE RAT and a new radio 5G RAT. Accordingly, a solution as described herein may dynamically cap or limit a number of users within a particular sector that can communicate with the access node using the new radio 5G RAT. Additional solutions may limit or cap the number of users in the cell edge of a sector using the particular RAT. The limit may be based on both detected interference levels and detected performance parameters.

Accordingly, embodiments set forth herein adjust caps on a number of wireless devices utilizing a particular RAT based upon a magnitude of interference and a measurement of performance parameters. In order to measure interference, the system may analyze uplink noise in order to determine a value of interference at a base station or access node. The measure of performance may include aggregate throughput per user or per sector. Signal to noise ratio (SNR) may be analyzed for measuring interference. As set forth above, throughput and SNR are measures of performance and interference respectively. However, other key performance indicators (KPIs) can be utilized for measurement to evaluate whether limits or caps should be set on the number of devices utilizing a particular RAT. The dynamic adjustment of the number of wireless devices eligible to utilize a particular RAT results in an improvement to the overall performance of the network and service to the individual wireless devices.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a gigabit NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for reducing interference and improving performance may be implemented as computer-readable instructions or methods, and processing nodes on the network for executing the instructions or methods. The processing node may include a processor included in the access node or a processor included in any controller node in the wireless network that is coupled to the access node.

Figure 1:
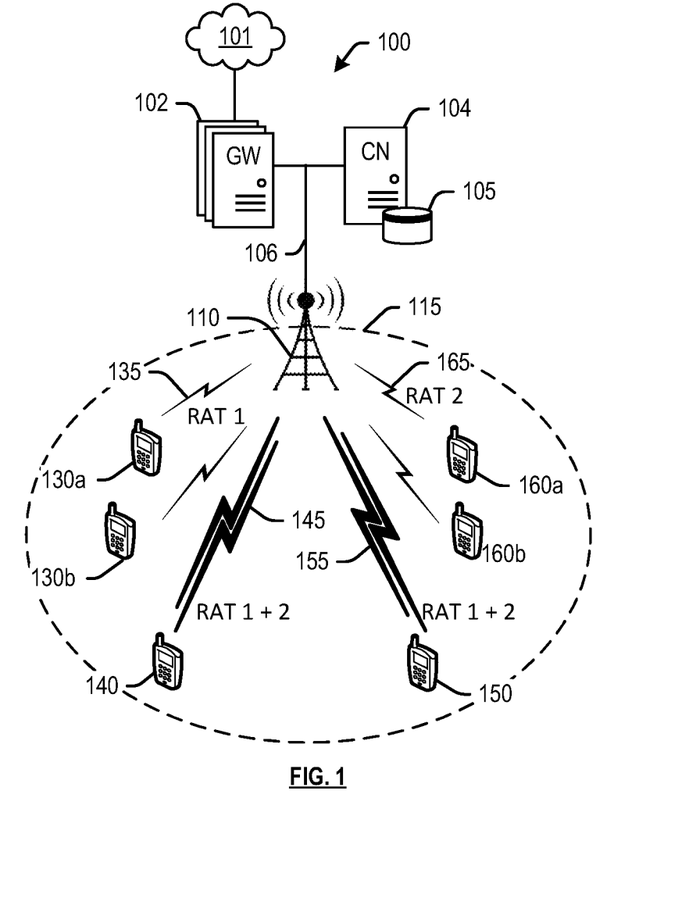
FIG. 1 depicts an exemplary system for wireless communication, in accordance with the disclosed embodiments.

FIG. 1 depicts an exemplary system for wireless communication. System 100 may be a wireless communication network, such as a cellular network. System 100 may include a communication network 101, a gateway 102, a controller node 104, and one or more access nodes 110. One or more end-user wireless devices may be directly connected to access node 110, such as end-user wireless devices 130*a*, 130*b*, 140, 150, 160*a*, and 160*b*.

In this exemplary embodiment, access node 110 may be a macrocell access node configured to deploy at least two different carriers, each of which utilizes a different RAT. For example, a first carrier may be deployed by access node 110 in an LTE mode, and a second carrier may be deployed by access node 110 in an NR mode. Thus, in an embodiment, access node 110 may comprise two co-located cells, or antenna/transceiver combinations that are mounted on the same structure. In some embodiments, multiple access nodes 110 may be deployed and each access node 110 may support a different RAT. For example, a gNodeB may support NR and an eNodeB may provide LTE coverage. The carriers may further utilize different frequency bands or sub-bands and additionally may be deployed using different types of multiplexing modes. In other embodiments, any other combination of access nodes and carriers deployed therefrom may be evident to those having ordinary skill in the art in light of this disclosure.

Wireless devices 130*a*, 130*b*, 140, 150, 160*a*, and 160*b* are illustrated as being in communication with access node 110 over various types of communication links. Each of the end-user wireless devices 130*a*, 130*b*, 140, 150, 160*a*, and 160*b* may be attached to the wireless air interface deployed by access node 110. Wireless links 135 and 165, as well as other wireless links that directly couple end-user wireless devices 140*a*, 140*b*, 140*c*, and 140*d* with access node 110, as shown in FIG. 1, form the wireless network (or wireless radio air interface) deployed by access node 110 within coverage area 115.

In disclosed embodiments, wireless devices 130*a* and 130*b* are illustrated as being in communication with access node 110 using a first RAT, which may provide, for example an NR communications link 135. The NR communication link 135 may comprise any communication channel that utilizes air-interface resources of an NR carrier deployed by access node 110. Wireless devices 160*a* and 160*b* may be in communication with the access node 110 over a second RAT, which may be for example, an LTE communications link 165 provided by any LTE carrier connected to the access node 110. Further, wireless devices 140 and 150 are illustrated as being in communication with access node 110 over communication links 145 and 155 respectively. The communication links 145 and 155 utilize a carrier aggregation operating mode, i.e. they utilize wireless air interface resources from more than one carrier. For example, communication link 145 may utilize air-interface resources of at least one carrier utilizing the first RAT and at least another carrier, including any alternative carrier that in accordance with embodiments disclosed herein is using a second RAT and is connected with the access node 110. In embodiments an NR carrier is utilized as a primary carrier and at least on LTE carrier is utilized as a secondary carrier. Other configurations are within scope of the disclosure.

Access node 110 may be any network node configured to provide communication between end-user wireless devices 130a, 130b, 140, 150, 160a, and 160b and communication network 101, including standard access nodes such as a macro-cell access node, a base transceiver station, a radio base station, an eNodeB device, an enhanced eNodeB device, a gigabit NodeB (or gNodeB) in 5G New Radio ("5G NR"), or the like. For example, access node 110 may implement 5G NR technologies to deploy a wireless network that supports frequency bands ranging from, e.g., 600 MHz to 100 GHz. In some embodiments, access node 110 may deploy a wireless network that supports frequency bands ranging from 3 GHz to 100 GHz. In some embodiments, access node 110 may deploy a wireless network that supports multiple frequency bands selected from 3 GHz to 100 GHz. In an exemplary embodiment, a macro-cell access node 110 may have a coverage area 115 in the range of approximately five kilometers to thirty-five kilometers and an output power in the tens of watts. In an embodiment, access node 110 may comprise two co-located cells, or antenna/transceiver combinations that are mounted on the same structure. Alternatively, access node 110 may comprise a short range, low power, small-cell access node such as a microcell access node, a picocell access node, a femtocell access node, or a home eNodeB device.

In other embodiments, any other combination of access nodes and carriers deployed therefrom may be evident to those having ordinary skill in the art in light of this disclosure.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access nodes 110 are further described with reference to FIG. 2.

Wireless devices 130a, 130b, 140, 150, 160a and 160b may be any device, system, combination of devices, or other such communication platform capable of communicating wirelessly with access node 110 using one or more frequency bands and wireless carriers deployed therefrom. Each of wireless devices 130a, 130b, 140, 150, 160a, 160b may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices may be or include high power wireless devices or standard power wireless devices. Other types of communication platforms are possible.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals and carrying data, for example, to support voice, push-to-talk, broadcast video, and data communications by end-user wireless devices 130a, 130b, 140, 150, 160a, and 160b. Wireless network protocols may include one or more of Multimedia Broadcast Multicast Services (MBMS), code division multiple access (CDMA) 1xRTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations, improvements, or variations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include Si communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G NR and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a standalone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. The controller node 104 may further operate as an element management system that controls access nodes in the network 101. In this instance, the element management system may be operable to measure performance metrics and interference within the network 101. One of ordinary skill in the art would recognize that controller node 104 is not limited to any specific technology architecture, such as Long Term Evolution (LTE) or 5G NR and may be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as types and duplexing methods of carriers deployed by access node 110, power classes and carrier aggregation capabilities of wireless devices 130a, 130b, 140, 150, 160a, and 160b associations therebetween. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
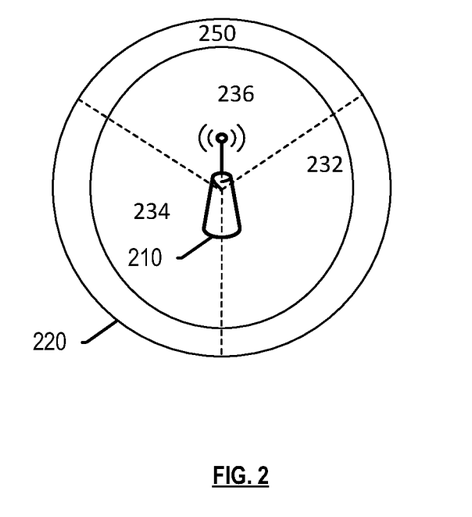
FIG. 2 illustrates an exemplary configuration of an access node coverage area.

FIG. 2 illustrates an exemplary configuration of an access node coverage area 220. An access node 210 communicates with wireless devices within a coverage area 220. The coverage area 220 may be divided into multiple sectors 232, 234, and 236. A cell edge 250 within the coverage area 220 exists in each of the sectors 232, 234, and 236. Areas within the cell edge 250 are likely to overlap with coverage areas of other access nodes. Further, as set forth herein, devices communicating with access node 210 from the cell edge 250 may use a greater uplink transmit power than devices located closer to the access node 210.

Figure 3:
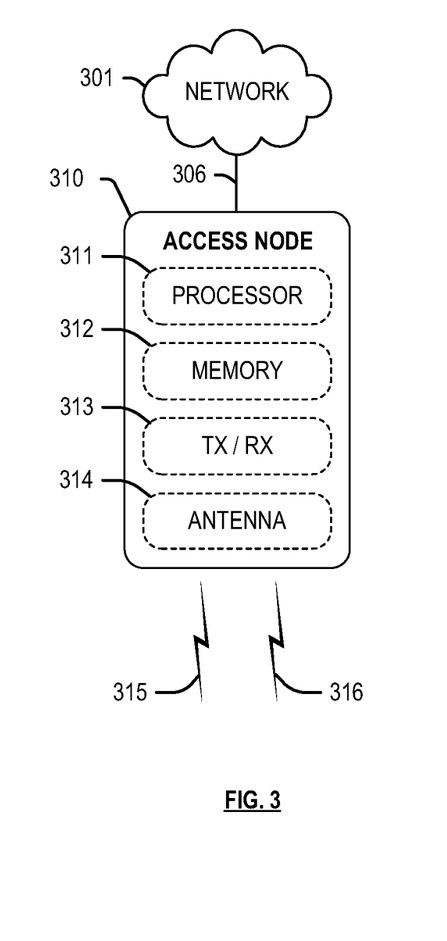
FIG. 3 depicts an exemplary access node, in accordance with the disclosed embodiments.

FIG. 3 depicts an exemplary access node 310. Access node 310 may comprise, for example, a macro-cell access node, such as access node 310 described with reference to FIG. 1. Access node 310 is illustrated as comprising a processor 311, memory 312, transceiver 313, and antenna 314. Processor 311 executes instructions stored on memory 312, while transceiver 313 and antenna 314 enable wireless communication with other network nodes, such as wireless devices and other nodes. For example, access node 310 may be configured to deploy at least two different carriers 315, 316. The carriers 315 and 316 may utilized different RATs. For example, a first carrier 315 utilizing a first RAT may be deployed by access node 310, and a second carrier 216 utilizing a second RAT may be deployed by access node 310. These features may be enabled by access node 310 comprising two co-located cells, or antenna/transceiver combinations that are mounted on the same structure. Network 301 may be similar to network 101 discussed above. Carrier aggregation mode, during which a wireless device utilizes more than one carrier, enables the wireless devices to communicate with access node 310 using a combination of resources from both carriers 315 and 316.

Further, instructions stored on memory 312 can include instructions for dynamically limiting a number of devices using a particular RAT, which will be further explained below with reference to FIGS. 5-7. The instructions may facilitate monitoring a level of interference and performance level of wireless devices and comparing the monitored level stored metrics or stored predetermined thresholds. If the measured values are outside of predetermined boundaries, the instructions may dictate dynamically adjusting a cap or limit imposed on the number of wireless devices eligible to utilize the particular RAT. Additionally, in embodiments, during low loading conditions on the particular RAT, the access node may dynamically increase the limit on the number of devices eligible to utilize the particular RAT to enable higher usage and balance the network load.

Figure 4:
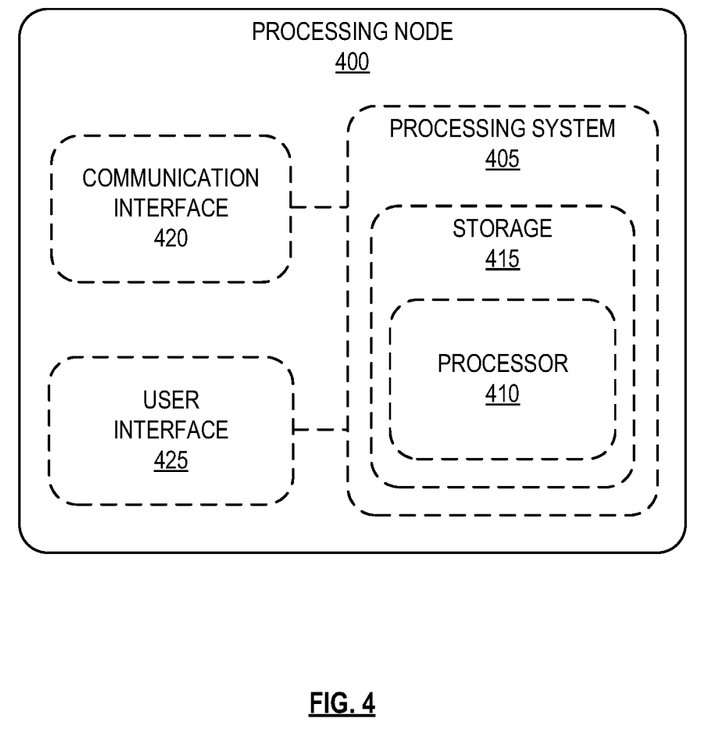
FIG. 4 depicts a processing node in accordance with the disclosed embodiments

FIG. 4 depicts an exemplary processing node 400, which may be configured to perform the methods and operations disclosed herein for reducing interference and improving performance in a wireless network. In some embodiments, processing node 400 may be included in an access node, such as access node 110 or 310. In further embodiments, processing node 400 may be included in controller node 104 and may be configured for controlling the access nodes.

Processing node 400 may be configured for performing interference mitigation and performance improvement in the network as set forth above. The interference mitigation and performance improvement may be performed dynamically in real time based on captured measurements indicative of a load on resources utilizing particular RAT technologies in a network, such as the network 101. Processing node 400 may include a processing system 405. Processing system 405 may include a processor 410 and a storage device 415. Storage device 415 may include a disk drive, a flash drive, a memory, or other storage device configured to store data and/or computer readable instructions or codes (e.g., software). The computer executable instructions or codes maybe accessed and executed by processor 410 to perform various methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein. Processor 410 may be a microprocessor and may include hardware circuitry and/or embedded codes configured to retrieve and execute software stored in storage device 415.

Processing node 400 may include a communication interface 420 and a user interface 425. Communication interface 420 may be configured to enable the processing system 405 to communicate with other components, nodes, or devices in the wireless network. Communication interface 420 may include hardware components, such as network communication ports, devices, routers, wires, antenna, transceivers, etc. User interface 425 may be configured to allow a user to provide input to processing node 400 and receive data or information from processing node 400. User interface 425 may include hardware components, such as touch screens, buttons, displays, speakers, etc. Processing node 400 may further include other components such as a power management unit, a control interface unit, etc.

The disclosed methods for dynamically reducing interference and improving performance are discussed further below. FIG. 5 illustrates an exemplary method 500 for dynamically reducing interference and improving performance in a network utilizing at least two RATs by imposing a limit or lowering the existing limit on a number of devices that can connect over the first RAT. Method 500 may be performed by any suitable processor discussed herein, for example, a processor included in access node 110 or 210, processor 410 included in processing node 400, or a processor included in controller node 104. For discussion purposes, as an example, method 500 is described as being performed by a processor included in access node 110.

Method 500 starts in step 510 and the access node may monitor both an interference level and a performance metric. The interference level and performance metric may be measured, for example, within a sector of a wireless network. The interference level may be measured by determining, for example, a signal to noise ratio (SNR) within a sector. The performance metric may be measured by determining key performance indicators (KPIs), such as throughput and latency. The measurements may occur in real time or alternatively, on a periodic basis at regular time intervals (e.g., 5 min, 15 min, 1 hour, etc.)

In step 520, the method includes comparing the measured interference level from step 510 to a stored threshold level. Step 520 additionally includes comparing the measured performance metric from step 510 to a stored performance threshold. The comparison of step 520 may occur in real time or alternatively on a periodic basis.

In step 530, the method determines whether the measured interference in the sector exceeds a predetermined threshold and in step 540 the method includes determining whether the performance metric is below the predetermined threshold. These comparisons may be made simultaneously or sequentially in any order. If the interference is sufficiently high and the performance is below the present threshold, the system may, in step 550, dynamically impose a cap or dynamically downwardly adjust an existing cap on the number of wireless devices using the first RAT, which in disclosed embodiments, may be a 5G NR RAT. The reduction in the number of devices permitted to utilize 5G results in an improvement in performance and a reduction in interference within the impacted sector.

After limiting the number of devices using the 5G RAT in step 550, the system may return to monitor the interference level and performance metric in step 510. The method for dynamically lowering the limit shown in FIG. 5 may occur simultaneously with a method for dynamically increasing the limit as shown in FIG. 6.

While the method aims to dynamically lower the number of wireless devices connected to the first RAT when sufficient interference exists and when performance is sufficiently negatively impacted, it may also be desirable to dynamically raise the limit on the number of devices utilizing the first RAT to effectively and efficiently distribute network resources when interference is not present. Accordingly, FIG. 6 illustrates a method for raising the limit on the number of wireless devices utilizing the first RAT in order to improve performance. Method 600 may be performed by any suitable processor discussed herein, for example, a processor included in access node 110 or 310, processor 410 included in processing node 400, or a processor included in controller node 104. For discussion purposes, as an example, method 600 is described as being performed by a processor included in access node 110. The method 600 begins in step 610 as the interference level and performance metric in a sector of the network deploying multiple RATs are monitored.

In step 620, the method compares the interference level and the performance metric to a second set of predetermined thresholds. For example, a low interference threshold may be chosen for the second threshold. A high performance metric threshold may be chosen as the second performance metric threshold such that throughput is at a high level when it reaches the second threshold.

In step 630, the system determines if interference is below the second threshold and in step 640, the system determines if performance is above the second threshold. If these conditions exist, the system may, in step 650, dynamically raise the limit on the number of devices in the sector permitted to utilize the first RAT. If these conditions do not exist, the system may continue to monitor the interference level and performance metric in step 610.

Figure 5:
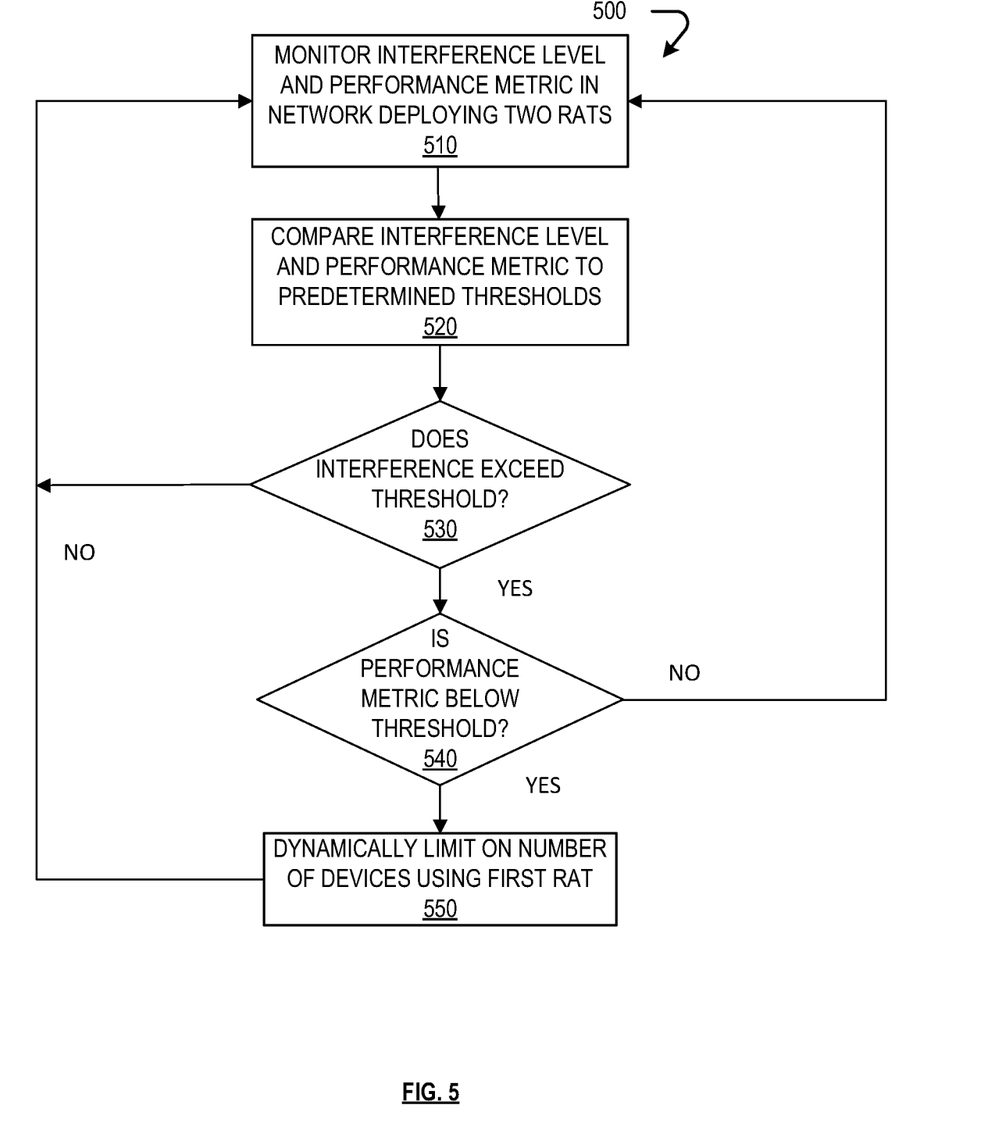
FIG. 5 depicts an exemplary method for dynamically mitigating interference and improving performance by limiting a number of wireless devices in a sector utilizing a first RAT.
Figure 6:
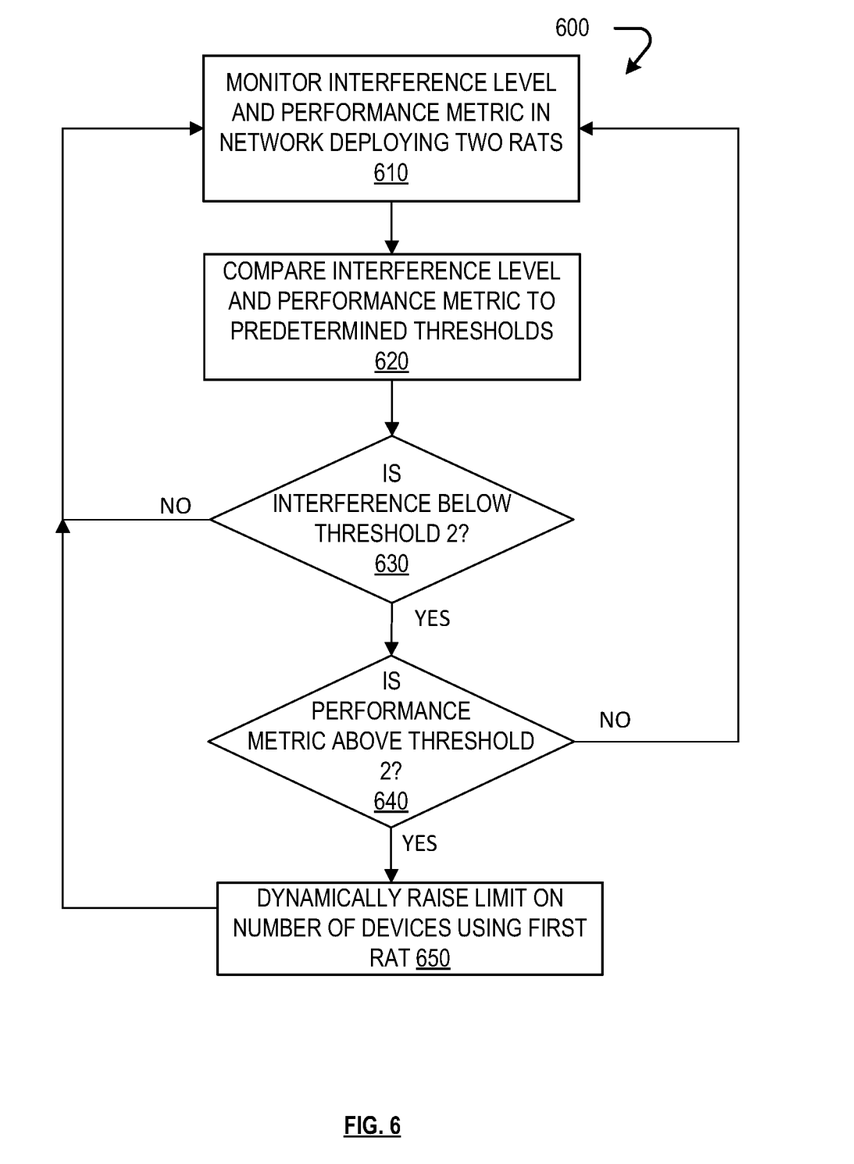
FIG. 6 depicts an exemplary method for dynamically adjusting a limit on devices utilizing the first RAT in a sector.

As set forth above, the methods of FIGS. 5 and 6 may be performed simultaneously so that the limit on the number of devices utilizing the first RAT is dynamically raised and lowered as conditions dictate to maximize performance and minimize interference. In many situations, the measured values of interference and performance will fall between the first and second thresholds and no changes to the limit on the number of wireless devices operating in the sector using the first RAT would be made.

Figure 7:
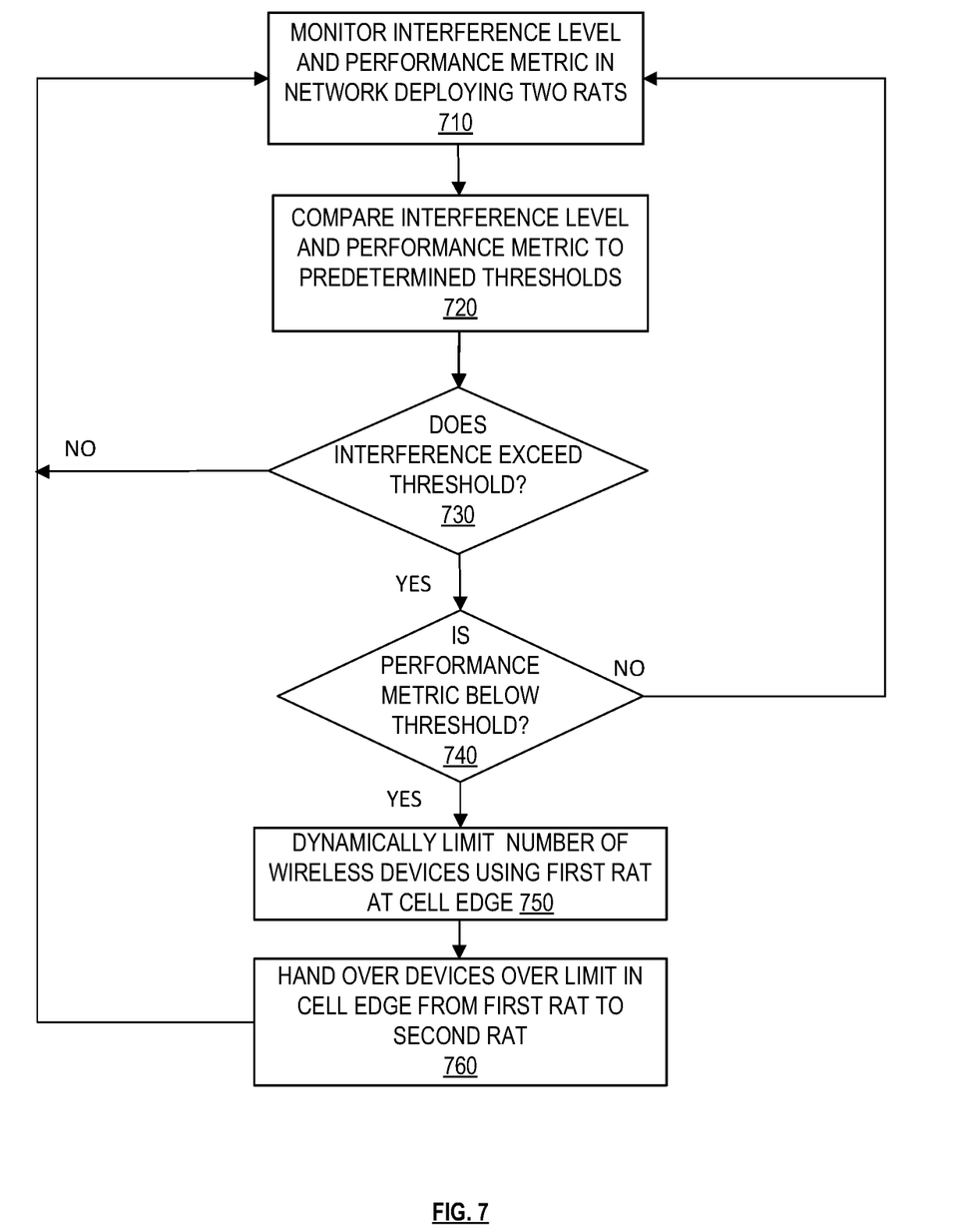
FIG. 7 illustrates a further exemplary method for dynamically mitigating interference and improving performance by limiting a number of wireless devices in a cell edge using a first RAT.

FIG. 7 depicts an additional exemplary method 700 for dynamically adjusting a limit on a number of devices using a first RAT within a sector in order to reduce interference and enhance performance. Method 700 may be performed by any suitable processor discussed herein, for example, a processor included in access node 110 or 310, processor 410 included in processing node 400, or a processor included in controller node 104. For discussion purposes, as an example, method 700 is described as being performed by a processor included in access node 110. Compared with methods 500 and 600, method 700 includes additional steps or operations.

In method 700, the processor monitors interference and performance within a sector of a network deploying two RATs. The method of FIG. 7 may also incorporate the functionality described in conjunction with FIGS. 5 and 6. In step 710 the processor may monitor both an interference level and a performance metric. The interference level and performance metric may be measured, for example, within a sector of a wireless network. The interference level may be measured through determination of the SNR. The performance metric may be measured by determining throughput per device or aggregate network throughput. The determination may be made, for example, by an element management system encompassed by the controller node 104. In all displayed methods, other measurement techniques may be employed. For example, the wireless devices may send reports to the access node indicating a performance level. The measurements may occur in real time or alternatively, on a periodic basis at regular time intervals (e.g., 5 min, 15 min, 1 hour, etc.)

In step 720, the processor compares the measured interference level from step 710 to a stored threshold level. Step 720 additionally includes comparing the measured performance metric from step 710 to a stored performance threshold. The comparison of step 720 may occur in real time or alternatively on a periodic basis.

In step 730, the method determines whether the measured interference in the sector exceeds a predetermined threshold and in step 740 the method includes determining whether the performance metric is below the predetermined threshold. These comparisons may be made simultaneously. If the conditions are not met, the system continues monitoring in step 710. However, if the interference is sufficiently high and the performance is below the present threshold, the system may dynamically adjust the cap on the number of wireless devices using the first RAT in a cell edge area of the sector in step 750. In embodiments, the first RAT may be a 5G NR RAT. The reduction in the number of devices permitted to utilize 5G at the cell edge results in an improvement in performance and a reduction in interference within the impacted sector.

After dynamically limiting the number of wireless devices using the first RAT at the cell edge in step 750, the system may hand over devices over the limit in the cell edge from the first RAT to the second RAT in step 760. The system continues monitoring in step 710.

The method of FIG. 7 may be combined with the method of FIG. 6 to dynamically adjust the number of devices at the cell edge of the impacted sector by reducing and increasing the limit based on measured performance metrics and interference.

In some embodiments, methods 500, 600, and 700 may include additional steps or operations. Furthermore, the methods may include steps shown in each of the other methods. Further, the methods may determine a number of devices for optimal network usage so that wireless carriers receive full benefit of available network resources and throughput will be improved for end users. As one of ordinary skill in the art would understand, the methods 500, 600, and 700 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for mitigating interference and improving performance for wireless devices within a sector in a cellular network providing a first and second radio access technology (RAT), the method comprising:
measuring interference within the sector;
determining that the interference within the sector exceeds a threshold interference value;
measuring a performance metric of the wireless devices within the sector,
wherein at least some of the wireless devices operating within the sector utilize Evolved Universal Terrestrial Radio Access New Radio-Dual Connectivity (EN-DC) mode utilizing the first RAT and the second RAT simultaneously,
wherein the first RAT is a fifth generation (5G) RAT and the second RAT is a 4G LTE RAT, the first RAT allowing higher uplink transmission power than the second RAT;
comparing the performance metric to a predetermined value to determine if the performance metric is below the predetermined value;

upon determination that the performance metric is below the predetermined value and that the interference exceeds the threshold interference value, dynamically and continuously imposing a cap on a number of wireless devices eligible to operate using the first RAT within the sector; and triggering a hand over of wireless devices exceeding the dynamically and continuously imposed cap from the 5G RAT to the 4G RAT.

2. The method of claim 1, further comprising dynamically and continuously imposing the cap on the number of wireless devices using the first RAT eligible to operate within a predetermined region of the sector, the predetermined region comprising an area smaller than the sector, wherein wireless devices within the predetermined region transmit using higher uplink transmission power than wireless devices in other regions of the sector.

3. The method of claim 2, further comprising dynamically and continuously imposing the cap on the number of wireless devices using the first RAT operating within the predetermined region of the sector when a measured power level of the wireless devices using the first RAT exceeds a predetermined value.

4. The method of claim 1, further comprising measuring the interference by measuring uplink noise within the sector.

5. The method of claim 1, wherein the measured performance metric is throughput.

6. The method of claim 5, wherein the throughput is at least one of throughput per user and aggregate throughput per sector.

7. The method of claim 1, further comprising monitoring the performance metric on a periodic basis.

8. A system for mitigating interference and improving performance for wireless devices within a sector in a cellular network providing a first and a second radio access technology (RAT), the system comprising:

an access node having a processor performing operations including:
measuring interference within the sector;
determining that interference within the sector exceeds a threshold interference value;
measuring a performance metric of the wireless devices within the sector,
wherein at least some of the wireless devices operating within the sector utilize Evolved Universal Terrestrial Radio Access New Radio-Dual Connectivity (EN-DC) mode utilizing the first RAT and the second RAT simultaneously,
wherein the first RAT is a fifth generation (5G) RAT and the second RAT is a 4G LTE RAT, the first RAT allowing higher uplink transmission power than the second RAT;
comparing the performance metric of the wireless devices to a predetermined value to determine if the performance metric is below the predetermined value;
upon determination that the performance metric is below the predetermined value and that the interference exceeds the threshold interference value, dynamically and continuously imposing a cap on a number of wireless devices eligible to operate using the first RAT within the sector; and
triggering a hand over of wireless devices exceeding the dynamically and continuously imposed cap from the 5G RAT to the 4G RAT.

9. The system of claim 8, wherein the processor dynamically and continuously imposes the cap on the number of wireless devices using the first RAT eligible to operate within a predetermined region of the sector, the predetermined region comprising an area smaller than the sector, wherein wireless devices within the predetermined region transmit using higher uplink transmission power than wireless devices in other regions of the sector.

10. The system of claim 8, wherein the system further measures the interference by measuring uplink noise within the sector.

11. The system of claim 8, wherein the performance metric is throughput.

12. The system of claim 11, wherein the throughput is at least one of throughput per user and aggregate throughput per sector.

13. A processing node for mitigating interference and improving performance for wireless devices within a sector of a cellular network providing a first and second radio access technology (RAT), the processing node performing operations including:

determining that interference within the sector exceeds a threshold interference value;
measuring a performance metric of the wireless devices within the sector,
wherein at least some of the wireless devices operating within the sector utilize Evolved Universal Terrestrial Radio Access New Radio-Dual Connectivity (EN-DC) mode utilizing the first RAT and the second RAT simultaneously,
wherein the first RAT is a fifth generation (5G) RAT and the second RAT is a 4G LTE RAT, the first RAT allowing higher uplink transmission power than the second RAT;
comparing the performance metric of the wireless devices to a predetermined value to determine if the performance metric is below the predetermined value;
upon determination that the performance metric is below the predetermined value and that the interference exceeds the threshold interference value, dynamically and continuously imposing a cap on a number of wireless devices operating using the first RAT within a predetermined region of the sector, the predetermined region comprising an area smaller than the sector, wherein wireless devices within the predetermined region transmit using a higher uplink transmission power than wireless devices in other regions of the sector; and
triggering a hand over of wireless devices exceeding the dynamically and continuously imposed cap from the 5G RAT to the 4G RAT.

14. The processing node of claim 13, wherein the operations further include receiving the performance metric periodically from an element management system.

* * * * *